United States Patent [19]

Murray

[11] Patent Number: 4,637,337

[45] Date of Patent: Jan. 20, 1987

[54] SHOPPING GUIDE DEVICE AND THE LIKE

[76] Inventor: Alan A. Murray, 120 S. Swall Dr., Apt. 103, Los Angeles, Calif. 90048

[21] Appl. No.: 677,087

[22] Filed: Nov. 30, 1984

[51] Int. Cl.⁴ .............................................. G09F 7/10
[52] U.S. Cl. ..................................... 116/323; 40/488; 235/123
[58] Field of Search ............... 40/486, 488; 235/89 R, 235/123; 116/323, 325; 428/14, 45, 81, 134, 136

[56] References Cited

U.S. PATENT DOCUMENTS

| | | | |
|---|---|---|---|
| 475,871 | 5/1892 | Keifer et al. | 40/488 |
| 1,300,339 | 4/1919 | Brigden | 116/323 X |
| 1,598,322 | 8/1926 | Showalter | 116/323 |
| 2,089,772 | 8/1937 | Thalau | 116/323 |
| 2,461,811 | 2/1949 | Cusano | 235/123 |
| 2,695,000 | 11/1954 | Farkas et al. | 40/488 X |
| 3,046,932 | 7/1962 | Rodrigue | 116/323 |
| 3,913,249 | 10/1975 | Kaslow | 40/488 |
| 4,345,396 | 8/1982 | Janssen | 428/99 X |

Primary Examiner—Henry F. Epstein
Attorney, Agent, or Firm—Erik M. Arnhem

[57] ABSTRACT

A shopping guide device, comprising a table and a plate mountable thereon, said plate being imprinted with columnar lists of purchasable items, and have slits, respectively arranged vis-a-vis said items, and tabs, mounted slidably within said slits, for earmarking items to be purchased when any of said tabs are slided towards any of said items imprinted on the plate.

3 Claims, 4 Drawing Figures

U.S. Patent   Jan. 20, 1987   4,637,337
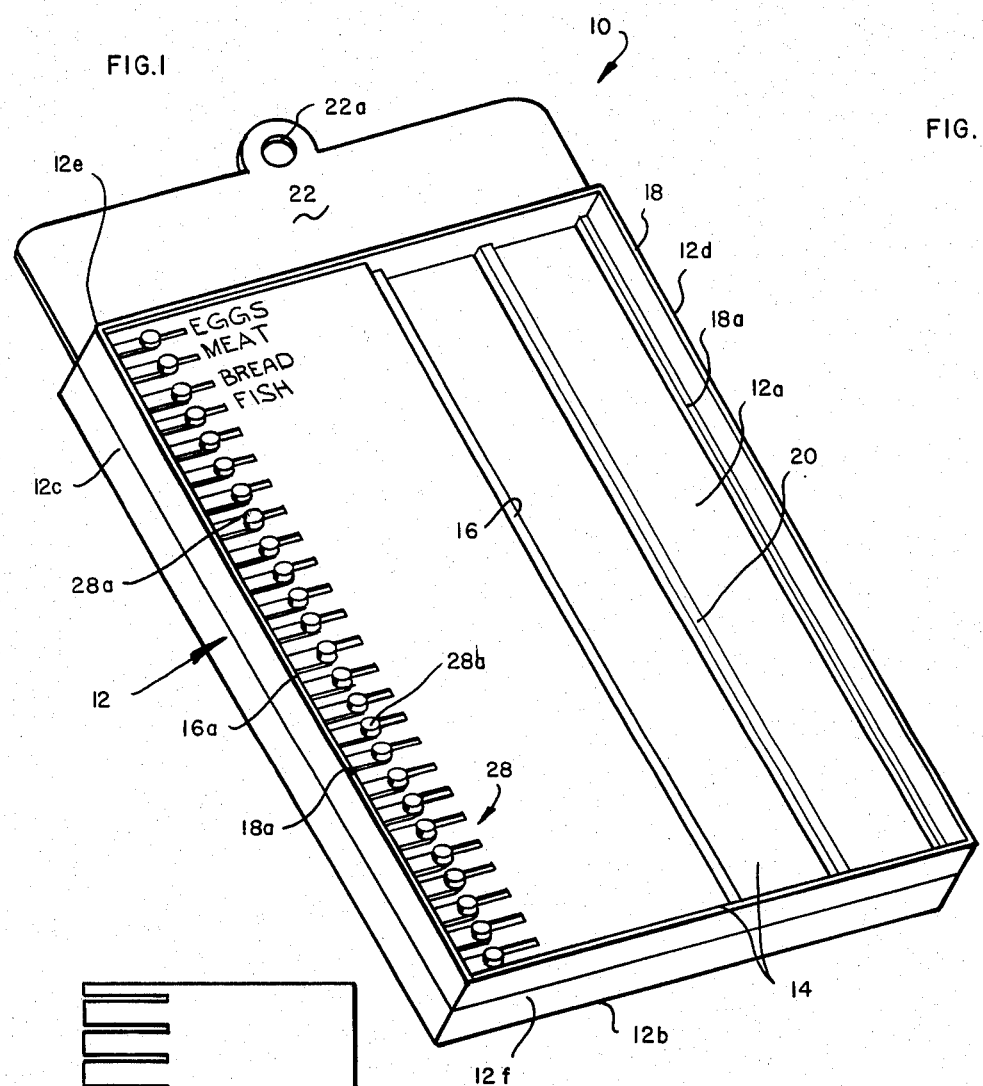
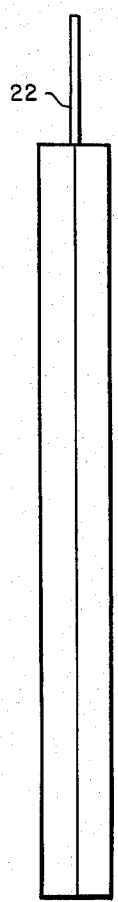
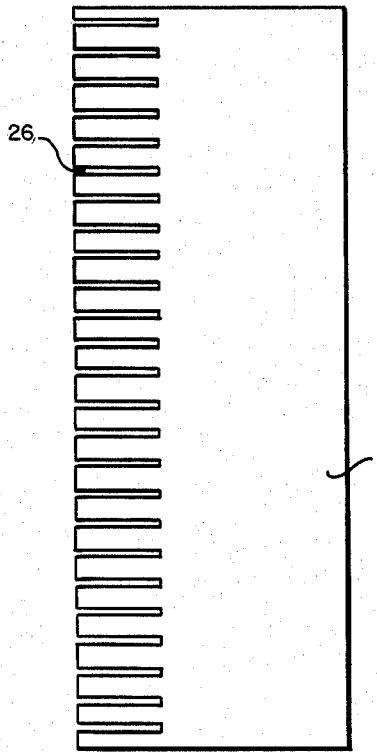
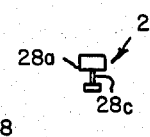
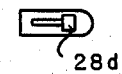

SHOPPING GUIDE DEVICE AND THE LIKE

CROSS-REFERENCE TO RELATED APPLICATION

None.

BACKGROUND OF THE INVENTION

Field of the Invention.

My invention refers, primarily to an optional shopping guide containing a virtually complete nomenclature of foodstuffs, general household articles, clothing, pharmaceuticals, etc. which a homemaker may use when shopping in supermarkets, department stores, drug stores, etc. Each item on the list is placed in juxtaposition with a slidable tab, enabling the user, in going through item by item, to refresh his/her memory as to what is needed and, then, by sliding the tab vis-a-vis an item, marking off that item for purchase.

SUMMARY OF THE INVENTION

In addition to what was stated under (d) above, the invention concerns a thin preferably double-faced table, listing, in alphabetical columnar order, all kinds of items which a shopper possibly would buy, when going e.g., to the supermarket.

Most shoppers, before going to a store, makes up a handwritten list of items to be purchased. Apart from the time consuming aspect of making such a list, the shopper quite often forget to put down needed items.

The present invention provides a table having preprinted lists of such items, which the user then may quickly glance through and, by means of a slideable indicator, "check-off" those items that he/she intends to buy on a particular day.

In addition to the convenience that the shopping guide, according to the invention, offers the shopper, the guide lends itself to advertising or promotion of e.g., a particular brand of food, which the user then would check-off.

The structure, according to the invention, may also be used for related purposes, such a check list for business transactions, traveling, etc.

Thus, it is an object of this invention to provide a shopping guide and the like which contains a complete nomenclature of items needed for general shopping, eliminating personal often incomplete handwritten notations;

It is a further object of the invention to provide a thin ready-to-use shopping guide, which the user conveniently may hold in a pocket;

It is still a further object of the invention to provide selective simple means on the shopping guide, enabling the user to quickly mark, or unmark items to be picked from the store shelves, respectively, placed in the shopping basket.

BRIEF DESCRIPTION OF THE DRAWINGS

FIG. 1 is a front perspective view of a shopping guide, according to the invention.

FIG. 2 is a side elevational view of the shopping guide.

FIG. 3a, 3b and 3c are side, respectively bottom and end views of an indicator tab for the shopping guide.

FIG. 4 is a front elevational view of one of the shopping lists mounted in the shopping guide.

DESCRIPTION OF THE INVENTION

In the drawings like reference characters designate similar parts in the several views of the drawings.

PREFERRED EMBODIMENT

In FIG. 1, numeral 10 indicates the shopping guide in its entirety.

A table 12, constituting the support for the shopping lists, comprises, preferably two surfaces 12a, 12b with lengthwise elongated sides 12c, 12d and shorter top and bottom sides 12e, 12f. Table surfaces 12a, 12b are, respectively divided into equally sized compartments 14, by a first rib 16, extending centrally and longitudinally between compartments 14.

Each table surface 12a, 12b is surrounded by a projecting rim 18, at least the elongated portions of which inwardly terminate, respectively in a ledge 18a.

Each compartment 14 is provided with a centrally disposed second reinforcing rib 20, extending parallel with rib 16. Ribs 16 and 20 and ledgers 18a are substantially of the same height.

Top side 12e terminates in a platelet 22, with a centrally upwardly projecting eye 22a, so that the shopping guide may be hung, when not being used, on a hook, nail, etc., at an easily accessible location.

Platelet 22 may serve as space for advertising purposes, e.g., if the shopping guide is used as a promotional item.

Plates 24 (FIG. 4) substantially dimensioned to be pressure fitted, glued or otherwised mounted within compartments 14, and, when so mounted, are resting, respectively on ledges 18a, ribs 16 and 20.

Plates 24 have, respectively at one of their inwardly or outwardly facing longitudinal edges, a multiplicity of open-ended slits 26.

A multiplicity of elongated T-shaped tabs 28, being of a lesser length than slits 26, the end of each horizontal portion 28a of which is topped by a knob 28b, while its vertical portion 28c terminates in a protuberance 28d.

Prior to mounting plates 24 in compartments 14, tabs 28 are inserted with their vertical portions 28c sliding within slits 26. Since each plate 24 is resting on ledge 18a, rib 16 and a portion of rib 20, and there is being provided a space between compartment 14 and plate 24, tabs 28 can slide freely within slits 26 of plate 24. Once plate 24 is placed in compartment 14, tabs 28 cannot escape sidewise, nor outwardly as protuberance 28d prevents the latter from so doing.

The utility and advantages of the shopping guide, according to the iuvention, were explained in detail under (d) and (e) above.

As also mentioned above, and indicated in FIG. 1, columnar lists of items are imprinted on plates 24 vis-a-vis tabs 28.

In sliding tab 28 inwardly through slit 26, the shopper may quickly earmark for purchase the item which is printed vis-a-vis the moved tab. Since the shopping guide contains virtually all possible items that a homemaker may buy, the guide also serve to refresh the shopper's memory as to needed items.

It may be advantageous to leave a few blank spaces, in which the user of the guide may write in erasable unlisted items vis-a-vis tabs.

While the foregoing has illustrated and described what is now contemplated to be the best mode of carrying out the invention, the description is, of course, subject to modifications without departing from the spirit and scope of the invention. Therefore, it is not desired to restrict the invention to the particular construction illustrated and described, but to cover all modification that may fall within the scope of the appended claims.

I claim:

1. A pre-printed shopping guide device, comprising:
   (a) a two-faced rectangular lengthwise elongated table, having shorter top and bottom sides, each face of said table being surrounded by a projecting rim terminating along its elongated sides in an inwardly extending ledge forming a compartment therewith, and a centrally and longitudinally extending first rib dividing said table faces, respectively into two equally sized compartments, respectively provided with a longitudinally centrally disposed second rib said ledge, first and second ribs extending parallel with one another at substantially equal heights.
   (b) Four rectangular lengthwise elongated plates, on which, respectively a columnar list of purchasable items are imprinted, being so dimensioned as to be mountable, respectively within said compartments and resting, when so mounted, on said ledge and ribs, each of said plates having along one of its elongated sides a multiplicity of open-ended slits columnarly arranged, respectively vis-a-vis one of said imprinted items on said plates.
   (c) A multiplicity of T-shaped tabs, being of shorter length than said slits for insertion respetively, slidably therewithin, any of said tabs capable of being slided towards or away from any of said imprinted items to be 2. A pre-printed shopping guide device, according to claim 1, wherein the T-shaped tabs are of an elongated shape, and respectively provided, at one end of their horizontal portion, with an upwardly projecting knob to facilitate the sliding movement of said tabs, their vertical portion being inserted within said slits and has a protuberance at one end thereof to prevent said tabs from escaping through said slit.

3. A pre-printed shopping guide device, according to claim 1, wherein in the top side of said table project beyond said rim thereof into a platelet, terminating in a centrally and upwardly projecting eye.

* * * * *